United States Patent
Gupta et al.

(10) Patent No.: US 10,853,101 B2
(45) Date of Patent: Dec. 1, 2020

(54) SYSTEMS AND METHODS FOR DISPLAYING FULLY-ACCESSIBLE INTERFACES USING A SINGLE CODEBASE

(71) Applicant: Oracle International Corporation, Redwood Shores, CA (US)

(72) Inventors: Mudit Gupta, Bangalore (IN); Jeevan Selvan Job John, Bangalore (IN); Shinoj Parameswaran, Bangalore (IN); Veena Vasu, Bangalore (IN); Russell Broom, Atlanta, GA (US); Pramod Agrawal, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/376,873

(22) Filed: Apr. 5, 2019

(65) Prior Publication Data
US 2020/0319901 A1    Oct. 8, 2020

(51) Int. Cl.
| | | |
|---|---|---|
| *G06F 3/00* | (2006.01) | |
| *G06F 9/451* | (2018.01) | |
| *G06F 3/16* | (2006.01) | |
| *G09B 21/00* | (2006.01) | |
| *G06F 9/54* | (2006.01) | |
| *G06F 3/0482* | (2013.01) | |

(52) U.S. Cl.
CPC .............. *G06F 9/451* (2018.02); *G06F 3/167* (2013.01); *G06F 9/542* (2013.01); *G09B 21/005* (2013.01); *G09B 21/007* (2013.01); *G06F 3/0482* (2013.01)

(58) Field of Classification Search
CPC .......... G06F 9/451; G06F 3/167; G06F 9/542; G06F 3/0482; G09B 21/005; G09B 21/007
See application file for complete search history.

(56) References Cited

U.S. PATENT DOCUMENTS

| | | | |
|---|---|---|---|
| 7,772,965 B2 | 8/2010 | Farhan et al. | |
| 8,074,175 B2 | 12/2011 | Brush et al. | |
| 2015/0317914 A1* | 11/2015 | Wohlert | G09B 21/006 340/4.14 |
| 2016/0124756 A1 | 5/2016 | Sadler et al. | |
| 2016/0202859 A1 | 7/2016 | Anzures et al. | |
| 2017/0076252 A1* | 3/2017 | Hausler | G06F 3/0481 |

OTHER PUBLICATIONS

Kingsley Okoye et al., Accessibility of dynamic web applications with emphasis on visually impaired users, Sep. 1, 2014, The Journal of Engineering, pp. 531-537 (Year: 2014).*

(Continued)

*Primary Examiner* — Tam T Tran
(74) *Attorney, Agent, or Firm* — Kilpatrick Townsend & Stockton, LLP

(57) ABSTRACT

Certain aspects and features of the present disclosure relate to systems and methods for simultaneously providing two versions of an application's interface using a single codebase. More specifically, certain aspects and features of the present disclosure relate to systems and methods for executing a single codebase to depict time-bound information in a calendar format and, at the same time, make the displayed time-bound information consumable by screen reader applications.

20 Claims, 6 Drawing Sheets

(56) References Cited

OTHER PUBLICATIONS

Armin Hezart et al., Solving Frame-Based Accessibility Problems in Web Content Management, Jan. 1, 2005, IEEE Xplore, pp. 1-5 (Year: 2005).*

Barker; Guy, "Considerations around the Accessibility of a Calendar Control", Microsoft Developer, Sep. 9, 2017, 12 pages, retrieved from: https://blogs.msdn.microsoft.com/winuiautomation/2017/09/09/considerations-around-the-accessibility-of-a-calendar-control/ on Oct. 31, 2018.

"Bravenet Online Calendars", 11 pages, retrieved from https://www.bravenet.com/onlinecalendars/ on Oct. 31, 2018.

"Event Bubble" DayPilot Organization, 5 pages, retrieved from: https://doc.daypilot.org/calendar/event-bubble/ on Oct. 31, 2018.

"HTML5 Scheduler Component", DayPilot-HTML5 Calendar, Scheduler and Gantt Chart Web Components, 7 pages, retrieved from: https://www.daypilot.org/ on Oct. 31, 2018.

"Google—Accessibility of Google Calendar", CU Office of Information Technology, University of Colorado, Boulder, last updated, Jan. 25, 2017, 3 pages, retrieved from: https://oit.colorado.edu/services/messaging-collaboration/gsuite/accessibility/calendar on Oct. 31, 2018.

"Google Calendar (Web, Android, iOS)", 2 pages, retrieved from: https://zapier.com/blog/best-calendar-apps/ on Oct. 31, 2018.

The Outlook Team, "New features coming to Outlook on the Web", Microsoft 365 Blog, Aug. 4, 2015, 8 pages, retrieved from: https://www.microsoft.com/en-us/microsoft-365/blog/2015/08/04/new-features-coming-to-outlook-on-the-web/ on Oct. 31, 2018.

"RadCalendar Overview", Progress Software Corporation, UI for asp.net AJAX Documentation-Telerik UI for asp.net AJAX, 2 pages, retrieved from: https://docs.telerik.com/devtools/aspnet-ajax/controls/calendar/overview on Oct. 31, 2018.

"Syncfusion Essential J52", 2 pages, retrieved from: https://ej2.syncfusion.com/documentation/calendar/accessibility.html?lang=typescript on Oct. 31, 2018.

"The Shared Calendar for Groups, Simplifying Organizing, Scheduling, and Communication", teamup, 5 pages, retrieved from: https://www.teamup.com/ on Oct. 31, 2018.

"WAI-ARIA Support and Screen Readers", Progress Software Corporation, US for asp.net AJAX Documentation— Telerick US for asp.net AJAX, 3 pages, retrieved from: https://docs.telerik.com/devtools/aspnet-ajax/controls/wai-aria-support-and-screen-readers on Oct. 31, 2018.

* cited by examiner

| Sunday | Monday | Tuesday | Wednesday | Thursday | Friday | Saturday |
|---|---|---|---|---|---|---|
|  | 1 Event | 2 Event Event | 3 | 4 | 5 Event | 6 |
| 7 | 8 | 9 | 10 Event Event Event | 11 | 12 | 13 Event —230 |
| 14 | 15 Event | 16 | 17 | 18 | 19 | 20 |
| 21 | 22 | 23 | 24 200 | | | |
| 28 | | | | | | |

Select a list     X

List of events for February 1
List of events for February 2
List of events for February 5   —220
List of events for February 10
List of events for February 13
List of events for February 15

SYSTEMS AND METHODS FOR DISPLAYING FULLY-ACCESSIBLE INTERFACES USING A SINGLE CODEBASE

TECHNICAL FIELD

The present disclosure generally relates to systems and methods that use a single codebase to simultaneously provide two different versions of an application; one version usable by sighted users and another version fully accessible to users who are blind or visually impaired. More particularly, according to certain embodiments, the present disclosure relates to systems and methods that execute a single codebase to display information on a web-based calendar and, simultaneously, to provide a fully-accessible version of the web-based calendar that is consumable by a screen reader application.

BACKGROUND

Configuring web-based applications to satisfy accessibility standards is critically important for developers. Further, configuring an interface of an application to be fully accessible involves enabling users who are blind or otherwise visually impaired to access all of the information that is displayed on the interface. For example, a screen reader application can be used to audibly present text information to the user. However, many applications do not satisfy accessibility standards, or in some cases, the applications that are accessible provide limited functionality to users who are blind or visually impaired.

Additionally, in some examples, many applications that do satisfy accessibility standards use multiple codebases; one codebase to execute the application that visually displays information to sighted users, and another codebase to execute the fully-accessible version of the displayed information for users who are blind or visually impaired. However, maintaining multiple codebases is technically challenging because updating each of the multiple codebases is effort-intensive, inefficient, and prone to error.

BRIEF SUMMARY

Certain aspects and features of the present disclosure relate to systems and methods for simultaneously providing two versions of an application's interface using a single codebase. More specifically, certain aspects and features of the present disclosure relate to systems and methods for executing a single codebase to depict time-bound information in a calendar format and, at the same time, make the displayed time-bound information consumable by screen reader applications. The systems and methods described herein can generate an interface to display the time-bound information in the calendar format for sighted users, and at the same time, provide functionality that enables users who are blind or visually impaired to navigate the displayed time-bound information using the existing commands of a screen reader application. Because full accessibility is coded into the single codebase (as described in greater detail herein), the application's interface can be viewed by sighted users, while at the same time, satisfying accessibility standards without having to code for an alternate or modified interface.

In some implementations, the single codebase may include one or more on-screen event elements (e.g., a code-based component of source code, such as a Hypertext Markup Language (HTML) element) that, when executed or rendered, causes a cell or object to be displayed in an interface, such as a web-based calendar. The displayed cell or object may include time-bound information. To illustrate and only as a non-limiting example, the time-bound information may include an event that will occur during a defined time duration, such as Tuesday from 2:00 P.M. to 4:00 P.M. The length and/or shape of the displayed cell or object may represent the time-bound information in a calendar format. Further, the on-screen event element within the single codebase may include a hidden event element (e.g., a special markup or class of the on-screen event element) that is configured to render certain text off-screen or in a manner that does not impact the displayed layout of the web-based calendar. For example, the class associated with the on-screen event element can, when the on-screen event element is rendered, simultaneously or at a substantially similar time render the time-bound information off screen so as to convey the displayed time-bound information to a screen reader application, or otherwise make the time-bound information available to be consumed by a screen reader application. As only a non-limiting example, the hidden event element may be a class, such as '.psc-calendar-srmarkup' that is rendered off screen without impacting the displayed layout of the interface or web-based calendar. In some implementations, because the hidden event element may be a class of the on-screen event element, the hidden event element may be rendered as part of the rendering of the on-screen event element, so that the cell including the time-bound information is rendered at the same time or substantially the same time (e.g., in an sequential order if the on-screen event element is rendered and then the class is rendered as special markup code associated with the on-screen event element) as the time-bound information is made available (e.g., rendered off screen) to be consumed by a screen reader application.

Advantageously, in some implementations, each on-screen event element may include or be associated with a hidden event element, which is rendered off screen at the same time of rendering the corresponding on-screen event element. Thus, any information displayed on the interface is accessible or consumable by a screen reader application without the need for a modified interface for users who are blind or visually impaired. To illustrate and only as a non-limiting example, an on-screen event element may be used to render a cell, in which the time-bound information is displayed, and a hidden event element associated with the on-screen event element may be rendered to convey the time-bound information to the screen reader application without impacting the layout of the calendar because the hidden event element is rendered off screen.

In some implementations, the web-based calendar may be configured to display several calendar views, such as a monthly view that displays all events within the selected month, a weekly view that displays all events within the selected week, a daily view that displays all events within the selected day, and so on. The present disclosure is not limited to the views described above, and thus, any timeframe can be used as the view of the calendar. In some implementations, certain views may satisfy accessibility standards without the need to render any hidden event elements because the on-screen event element may be coded to add additional information in an attribute to avoid the need for rendering a hidden event element. To illustrate and only as a non-limiting example, in a weekly view of a web-based calendar, Feb. 12, 2019 may be selected. The on-screen event element that corresponds to the events of Feb. 12, 2019 may be a list element, for which the Title attribute includes the text "List of events on Feb. 12, 2019." As such, the displayed cell corresponding to Feb. 12, 2019 may appear to be a table of events on the interface, but when consumed by the screen reader application, the phrase "List of events on Feb. 12, 2019" would be audibly presented by the screen reader application before the event information is audibly presented as a list (e.g., due to the on-screen element being configured as a list element). Advantageously, the configuration of the on-screen event element as a list element with additional text included in the Title attribute reduces unnecessary data that the screen reader application would otherwise consume, thereby making the full accessibility of the web-based calendar more efficient.

Additionally, a technical advantage of configuring the on-screen event elements as a list element is that users who are blind or visually impaired can use the existing commands of screen reader applications to navigate through the various events displayed on the web-based calendar. To illustrate and only as a non-limiting example, an existing command for a screen reader application may be "fetch all lists displayed on the screen." The screen reader application can then retrieve the lists of information displayed on the screen. For example, the screen reader application would retrieve the event information for each day of the month that has an event. The user can then continue using existing commands of the screen reader application to navigate through the retrieved lists. The first list of the plurality of lists retrieved may be the events for January $1^{st}$. According to certain embodiments described herein, because the on-screen event element for January $1^{st}$ may be configured as a list element (such that each event on January $1^{st}$ is structured as an event on a list of events), the command to fetch lists displayed on the interface enables the screen reader application to audibly present "List of events on January $1^{st}$" before reading the title (which may include the time-bound information) of each event set for January $1^{st}$. The user can select another existing command of the screen reader application to move to the next list, which may include the event information for January $7^{th}$. Thus, while rendering the on-screen event element causes a table of events to be displayed (e.g., one column and multiple rows with the multiple rows representing the list of events), structuring the on-screen event element as a list element also enables the screen reader application to retrieve all of the events displayed and audibly present the event information to the user. Further, the additional information coded into the on-screen event elements, such as the additional information added to the Title attribute of the on-screen event element (e.g., "List of events on Feb. 12, 2019") also makes the web-based calendar fully accessible and easy to navigate for users who are blind or visually impaired.

In some implementations, the fully accessible web-based calendar, as described above and herein, may be a calendar component configured to depict event information (e.g., time-bound event information, such as date and time range of an event) for any application that supports the underlying libraries that make up the calendar component. For example, the calendar component can be integrated into applications (e.g., by adding the source code of the calendar component to an application's source code, or by linking the calendar component to the application's database(s) that store the event data), such that the applications provide the event data (e.g., the time-bound information representing events) in a predefined format (e.g., Title of event, location of event, and time range of event), and the calendar component retrieves the event data from database(s) and displays the event data in a manner that is fully accessible to users who are blind or visually impaired. In some implementations, the calendar component may use web services, such as a RESTful API (Representational State Transfer Application Programming Interface) or any RESTful web service, to retrieve the event information for displaying in the web-based calendar in a fully-accessible manner.

Certain aspects and features of the present disclosure relate to a system of one or more computers configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: storing, by a server, event data generated by an application, the event data representing an event, the event data corresponding to a single codebase that includes each of an on-screen event element (e.g., the element rendered on-screen) and a hidden event element (e.g., the special markup attached to the on-screen element), and each of the on-screen event element and the hidden event element indicating at least one event parameter (e.g., any detail of an event, such as date, time, location, etc.) characterizing the event. The computer-implemented method also includes receiving a communication from a user device that is executing the application, the communication corresponding to a request to view the event within a calendar format, and the user device additionally executing a screen reader application. The computer-implemented method also includes retrieving the event data from the server. The computer-implemented method also includes automatically rendering each of the on-screen event element and the hidden event element included in the event data. The computer—implemented method also includes in response to rendering the on-screen event element, generating an object (e.g., the time bound on-screen element that shows the start time and end time of an event) that visually represents the event within the calendar format. The computer-implemented method also includes displaying the object that visually represents the event within the calendar format, the displayed object visually indicating the at least one event parameter that characterizes the event. The computer-implemented method also includes in response to rendering the hidden event element, generating audible data that audibly presents the at least one event parameter that characterizes the event. The computer-implemented method also includes facilitating an audible presentation using the audible data, the audible presentation audibly indicating the at least one event parameter by the screen reader application. Other embodiments of this aspect include corresponding computer systems, apparatus, and computer programs recorded on one or more computer storage devices, each configured to perform the actions of the methods.

One general aspect includes a system, including: one or more data processors; and a non-transitory computer-readable storage medium containing instructions which, when executed on the one or more data processors, cause the one or more data processors to perform operations including. The system also includes storing, by a server, event data generated by an application, the event data representing an event, the event data being a single codebase that includes each of an on-screen event element (e.g., the element rendered on-screen) and a hidden event element (e.g., the special markup attached to the on-screen element), and each of the on-screen event element and the hidden event element indicating at least one event parameter (e.g., date, time, location, etc.) characterizing the event. The system also includes receiving a communication from a user device that is executing the application, the communication corresponding to a request to view the event within a calendar format, and the user device additionally executing a screen reader application. The system also includes retrieving the event data from the server. The system also includes automatically rendering each of the on-screen event element and the hidden event element included in the event data. The system also includes in response to rendering the on-screen event element, generating an object (e.g., the time bound on-screen element that shows the start time and end time of an event) that visually represents the event within the calendar format. The system also includes displaying the object that visually represents the event within the calendar format, the displayed object visually indicating the at least one event parameter that characterizes the event. The system also includes in response to rendering the hidden event element, generating audible data that audibly presents the at least one event parameter that characterizes the event. The system also includes facilitating an audible presentation using the audible data, the audible presentation audibly indicating the at least one event parameter by the screen reader application. Other embodiments of this aspect include corresponding computer systems, apparatus, and computer programs recorded on one or more computer storage devices, each configured to perform the actions of the methods.

One general aspect includes a computer-program product tangibly embodied in a non-transitory machine-readable storage medium, including instructions configured to cause a data processing apparatus to perform operations including: storing, by a server, event data generated by an application, the event data representing an event, the event data being a single codebase that includes each of an on-screen event element (e.g., the element rendered on-screen) and a hidden event element (e.g., the special markup attached to the on-screen element), and each of the on-screen event element and the hidden event element indicating at least one event parameter (e.g., date, time, location, etc.) characterizing the event. The computer-program product also includes receiving a communication from a user device that is executing the application, the communication corresponding to a request to view the event within a calendar format, and the user device additionally executing a screen reader application. The computer-program product also includes retrieving the event data from the server. The computer-program product also includes automatically rendering each of the on-screen event element and the hidden event element included in the event data. The computer-program product also includes in response to rendering the on-screen event element, generating an object (e.g., the time bound on-screen element that shows the start time and end time of an event) that visually represents the event within the calendar format. The computer-program product also includes displaying the object that visually represents the event within the calendar format, the displayed object visually indicating the at least one event parameter that characterizes the event. The computer-program product also includes in response to rendering the hidden event element, generating audible data that audibly presents the at least one event parameter that characterizes the event. The computer-program product also includes facilitating an audible presentation using the audible data, the audible presentation audibly indicating the at least one event parameter by the screen reader application. Other embodiments of this aspect include corresponding computer systems, apparatus, and computer programs recorded on one or more computer storage devices, each configured to perform the actions of the methods.

BRIEF DESCRIPTION OF THE DRAWINGS

The specification makes reference to the following appended figures, in which use of like reference numerals in different figures is intended to illustrate like or analogous components.

FIG. 2 is an example interface that is fully accessible to a screen reader application, according to certain embodiments of the present disclosure.

DETAILED DESCRIPTION

Different versions of applications are often deployed using multiple codebases. However, managing and updating multiple codebases is technically burdensome and prone to error. For example, updating a feature of an application with multiple codebases can involve individually updating different segments of each codebase, while considering the differences between the various codebases. According to certain embodiments, multiple versions of an application or website can be deployed in a production environment using a single codebase. In some implementations, a calendar component can be integrated into an application. The calendar component can be configured to retrieve event data from a database within the application environment, and render the event data to display the events in a calendar format, while at the same time rendering certain elements (coded into the event data) off screen so as to make the event information available to a screen reader application (e.g., the text of the event can be audibly presented or read by the screen reader application).

Certain embodiments described herein advantageously provide a single interface (e.g., a web-based calendar) to both sighted users and users who are blind or visually impaired. The single interface can be navigated by sighted users with a cursor and by blind or visually impaired users with a screen reader application. In some implementations, the elements within the codebase of the interface are coded to, upon rendering, cause a cell or object representing an event to be displayed. Additionally, each element in the codebase is coded to, upon rendering, cause the event information included in the displayed cell or object to be consumed or otherwise made available for a screen reader application to audibly present to users who are blind or visually impaired. Thus, interfaces can satisfy accessibility standards with efficiency and error reduction.

Figure 1:
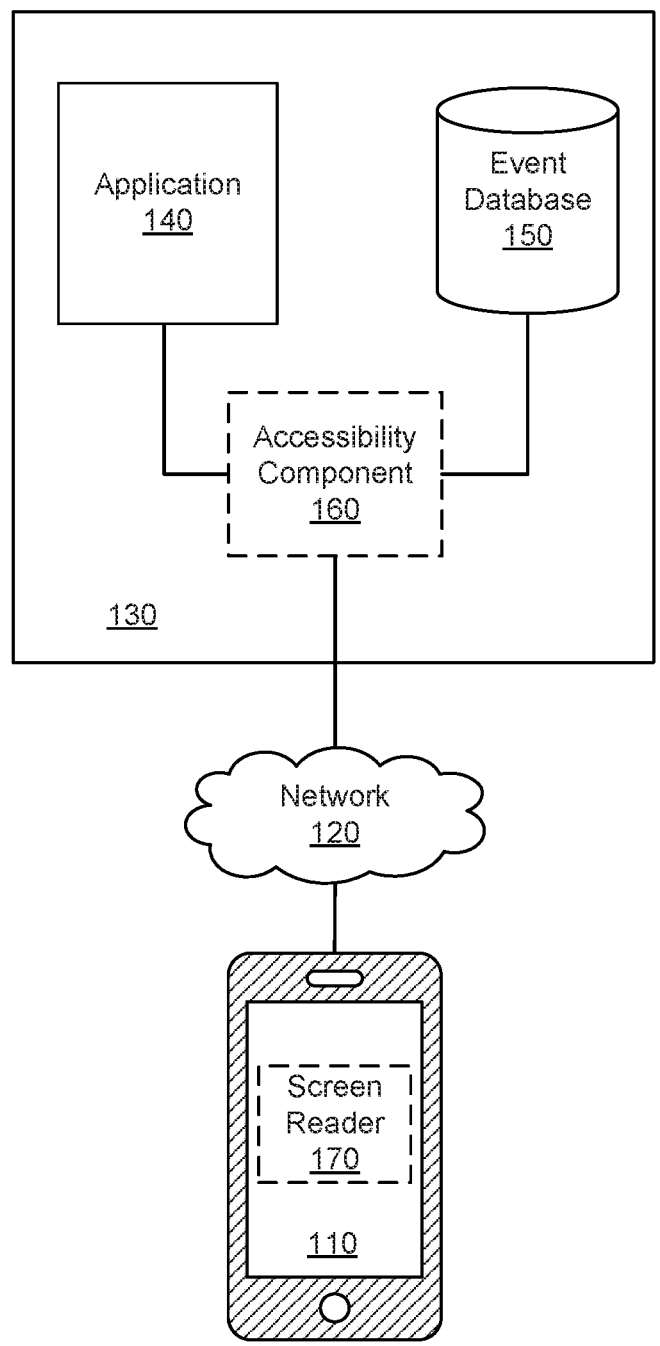
FIG. 1 is a block diagram illustrating an example network environment in which the web-based calendar is integrated to provide a fully-accessible web-based calendar to users who are blind or visually impaired.

FIG. 1 is a block diagram illustrating an example network environment 100 in which the web-based calendar is integrated to provide a fully-accessible web-based calendar to users who are blind or visually impaired. Network environment 100 may include user device 110 and application environment 130. User device 110 may communicate with application environment 130 using network 120. While user device 110 is illustrated as being a smartphone, it will be appreciated that user device 110 can be any portable electronic device (e.g., tablet computer, smartphone, smartphone, or any portable Internet- or non-Internet-connected device) or non-portable electronic device (e.g., desktop computer, electronic kiosk, etc.). Additionally, network 120 can be any public, private, or cloud-based network or group of networks that facilitates communication with the Internet.

Application environment 130 may be a network architecture or environment in which application 140 is deployed. As a non-limiting example, application environment 130 may be the production environment in which application 140 is deployed when application 140 is live to users or user devices. In some implementations, application environment 130 may include application 140 (deployed using one or more application servers not shown) and event database 150. Event database 150 may be a database or data store configured to store data associated with application 140. For example, event database 150 may be a database for application 140, such that event database 150 stores the data inputted, outputted, and/or processed by application 130.

In some implementations, event database 150 may store event data representing one or more events. For example, event data may include time-bound information stored in a predefined (e.g., structured), or unstructured format. Non-limiting examples of time-bound information may include the date of an event, the start time of an event, the end time of an event, the location of an event, the attendees of an event, the time zone of an event, and/or other suitable information relating to events. In some implementations, application 140 may not have existing capabilities to display the event data in a calendar format. Thus, accessibility component 160 may be integrated into or consumed by application 140 to add calendar functionality to application 140.

Accessibility component 160 may be a code-based component (e.g., a widget) configured to depict event data (e.g., time-bound event information, such as date and time range of an event) for any application, which has or does not have existing calendar functionality. For example, accessibility component 160 can be integrated into application 140 (e.g., by adding the source code of accessibility component 160 to the source code of application 140, or by adding accessibility component 160 as a widget to application 140), such that application 140 provides the event data (e.g., stored in event database 150) in a predefined, structured, or unstructured format (e.g., a format of "Title of event," location of event, time range of event), and accessibility component 160 retrieves the event data from event database 150 and displays the event data in a manner that is fully accessible to users who are blind or visually impaired. In some implementations, accessibility component 160 may use web services, such as a RESTful API (Representational State Transfer Application Programming Interface) or any RESTful web service, to retrieve the event data stored in event database 150, and render the retrieved event data to display the time-bound information in the web-based calendar, and at the same time, render the time-bound information off screen so as to be consumable (e.g., detectable as text, a header, or a list element by a screen reader application 170).

It will be appreciated that accessibility component 160 may be any code or code segments that, when integrated into an existing application, such as application 140, causes data stored at database(s) within application environment 130 to be displayed on a screen for sighted users, but also available at the same time to screen reader applications (such as screen reader application 170) for users who are blind or visually impaired. As such, the present disclosure is not limited to rendering event data so as to be fully accessible in a web-based calendar.

It will be appreciated that accessibility component 160 can process any data that includes on-screen event elements, such as HTML elements that can be rendered to display objects on a screen, so as to also render the data off screen in a manner that makes the data consumable by screen reader applications for users who are blind or visually impaired. For example, according to certain embodiments, as long as each on-screen event element of the data includes or is associated with a hidden event element (e.g., a class of an HTML element that can tag certain text to be rendered off screen and available to screen reader applications), then any displayable information can also be made available to screen reader applications without the need for multiple codebases.

FIG. 2 illustrates example calendar 200, which is rendered using a single codebase, and which is fully accessible to sighted users and users who are blind or visually impaired, according to certain embodiments of the present disclosure. Calendar 200 may display various events, such as event 230 (which is represented by an event cell), in a calendar format, as shown in FIG. 2. As a non-limiting example, calendar 200 shows a monthly view of events, however, the present disclosure is not limited thereto. Any time frame can be used as a view of calendar 200 (e.g., weekly event view, daily event view, and so on). Each event cell displayed in calendar 200, such as event 230, may be displayed in response to rendering an on-screen event element included in the event data of the events displayed. For example, the event data retrieved from the event database (e.g., event database 150) may include an on-screen event element specific to event 230. The on-screen event element may be a code-based element (e.g., an HTML element) that, when rendered, causes the event cell representing event 230 to be displayed in calendar 200. Additionally, the on-screen event element for event 230 may correspond to a hidden event element, which is also included in the event data. As a non-limiting example, the hidden event element may be a class that is attached to, coded within, or corresponds to an HTML element. The class can be used to tag certain text that can be rendered off screen (e.g., without any impact on the layout of the calendar), so that the tagged text can be detectable by a screen reader application. According the certain embodiments, the event information that is displayed can be tagged in the hidden event element so that all of the displayed information is also accessible to users who are blind or visually impaired.

In some implementations, a user who is blind or visually impaired can use a screen reader application (e.g., JAWS) to navigate the displayed information within calendar 200. To illustrate and only as a non-limiting example, a user who is blind or visually impaired can select a command to fetch all lists displayed in calendar 200. Each event displayed on calendar 200 may correspond to an on-screen event element and a hidden event element. In some implementations, the on-screen event element may be coded as a list element, which enables the information included in the on-screen event element to be detectable by screen reader applications as a list of text information. In response to the user's selection of the command to fetch all displayed lists, message 210 may be displayed or otherwise generated by the screen reader application that is currently running on the user device displaying calendar 200. Message 210 can include all lists that are detected on calendar 200. Each event is coded specifically to provide information about events to screen reader applications, and thus, each on-screen event element that corresponds to a displayed event cell may include a Title attribute "List of events for [date]." As such, in response to the existing command to fetch all lists displayed on the interface (e.g., calendar 200), message 210 may be generated so that the user can scroll through a list of the fetched lists of information (e.g., using arrow keys or other existing commands of the screen reader application). Further, the screen reader application can audibly present the Title attribute of each fetched list to the user as the user scrolls through the fetched lists, which is presented in message 210.

Continuing with the non-limiting example, if a user who is blind or visually impaired seeks event information for February $10^{th}$ on calendar 200, the user can fetch all displayed lists (e.g., and each event is coded as a list element with a Title attribute of "List of event for [date]") and scroll through the lists while the screen reader application audibly presents or reads "List of events for February $1^{st}$," "List of event for February $2^{nd}$" and so on, until the screen reader application reads "List of events for February $10^{th}$," at which point the user can select a command to further retrieve or read the event information for February $10^{th}$ (e.g., for the three event cells displayed on calendar 200 for February $10^{th}$) as shown in selection 220. Advantageously, calendar 200 can present event information for events (e.g., an event cell representing an event) to sighted users, while at the same time, satisfying accessibility standards by enabling all displayed information to be audibly presented using a screen reader application, and without needing to code multiple codebases (e.g., one codebase for sighted users, and another codebase for users who are blind or visually impaired).

In some implementations, calendar 200, as generated by the accessibility component (e.g., accessibility component 160) may support any number of views, for example, three views for displaying events; monthly, weekly, and daily. Calendar 200 is configured to enable the user to switch between views at any time. For example, if the user is interested in identifying the events for a given month without viewing the exact times at which the events occur, then the user can switch to the monthly view (as shown in FIG. 2). Similarly, if the user is more concerned about the specific times of the events in a given week or day, then the user can select or switch to the weekly or daily view, respectively. In some implementations, calendar 200, as generated by the accessibility component, can display events that overlap with each other on a given day (e.g., in the weekly or daily view). For example, the event cells for two overlapping events would be displayed as overlapping during a defined time period. In some implementations, calendar 200, as generated by the accessibility component, can display events that last multiple days. For example, the event cell for a multiple-day event may span several calendar days of calendar 200. In some implementations, for events that last all day without a start time or end time, calendar 200, as generated by the accessibility component, can display an event cell that spans an entire calendar day. Further, in some implementations, in the monthly view, the event cells displayed in calendar 200 may not differentiate between all-day events and events that last a specific time range.

As discussed above and herein, the accessibility component can generate an interface, such as calendar 200, using a single codebase in a manner that is fully usable to both sighted users and users who are blind or visually impaired.

As such, the displayed information in the interface, for example, the event information, may be fully accessible to screen reader applications, thereby enabling users who are blind or visually impaired to navigate information displayed on the interface. In some implementations, the markup of calendar 200 is coded, such that all event information is available to both sighted users (e.g., using the displayed event cells in calendar 200) and users who are blind or visually impaired (e.g., using the screen reader application audibly presenting the event information).

In some implementations, each calendar day displayed on calendar 200 may be coded as a container that includes one or more on-screen event elements and one or more hidden event elements. A user can select the current day on calendar 200. In response, calendar 200 can execute the container for the selected day. The container may be configured to represent "Today" in the monthly view to sighted users by displaying the selected calendar day in a specific color (e.g., yellow). Further, the hidden event element included in the container for the selected day may be coded specifically for the screen reader. As a non-limiting example, the hidden event element may include heading information that is rendered off screen using the class '.psc-calendar-srmarkup,' which does not impact the displayed interface for the sighted users. However, at the same time as the displayed current calendar day is changed to the specific color, the text 'Today' may be available for the screen readers to audibly present to the user.

In some implementations, each container for a given calendar day is coded specifically for screen reader applications. For example, as described above, the container for each calendar day may be rendered as a list element, which includes a Title attribute value of "List of events for [date]". The text included in the Title attribute can be detected by the screen ready and audibly presented or read to the user by the screen reader application before the screen reader application begins audibly presenting the event information for that specific day. In some implementations, a calendar day displayed on calendar 200 may not include any events. To convey that the calendar day has no events scheduled, the hidden event element corresponding to the selected calendar day may be coded, so as to make the text "No event" available to a screen reader application. The hidden event element in this example can be rendered off screen using the class '.psc-calendar-srmarkup,' so that there is no impact on the interface for the sighted users. However, at the same time, the text "No events" would be made available for the screen readers to audibly present to the user, so that the user understands that the selected calendar day has no events scheduled.

In some implementations, the accessibility component may be configured so as to convey, in a monthly view, a given date (e.g., month, day of the week, and day of the month) both to sighted users and to users who are blind or visually impaired without using multiple codebases. Accordingly, the container for each calendar day may include a hidden event element, as described above. As a non-limiting example, the hidden event element may a header, which has a class '.psc-calendar-srmarkup' so as to be rendered without impacting the displayed interface. The rendering of the hidden event element may provide the text of the full date (e.g., Monday, Feb. 21, 2019) to the screen reader application to audibly present or read aloud using a speaker to the user.

In some implementations, the accessibility component may be configured so as to convey, in the weekly or daily views, the duration of events without using multiple codebases. Accordingly, the hidden event element that corresponds to each event may include a class that, upon rendering, tags the text information representing the duration of the event as being available to the screen reader application. For example, in a weekly view, calendar 200 may display an event from 2:00 PM to 4:00 PM on a Tuesday using an event cell. At the same time, the screen reader application can read or audibly present the tagged text information of "2:00 PM to 4:00 PM" the use who is blind or visually impaired. Advantageously, because the codebase of the interface (e.g., the web-based calendar) is coded for displaying information, and simultaneously, rendering the displayed information off screen to be available to a screen reader application, the interface can be fully accessible to users who are blind or visually impaired without the burdens associated with multiple codebases. In some implementations, the duration information of the event may be coded directly into the on-screen event element, which is a list element. In this case, the duration information would not need to be rendered off screen using the hidden event element, but rather, the duration information would be retrievable by the screen reader application when the user selects the command to fetch all lists, and then further selects a particular event. Upon selecting the particular event, the duration information can be read aloud or otherwise audibly presented by the screen reader application to the user.

In some implementations, event cells displayed on calendar 200 may be different colors. Each color may represent a different type of event, such as a hearing, a meeting, a social engagement, and so on. The accessibility component can configure the codebase of calendar 200 to convey the event type information to users who are blind or visually impaired. For example, the type of event "meeting" can be coded into the list element as text, in addition to the duration information described above. In this case, the event type information may not need to be rendered off screen using the hidden event element, but rather, the event type information may be retrievable by the screen reader application when the user selects the command to fetch all lists, and then further selects a particular event. Upon selecting the particular event, the duration information and/or the event type information can be read aloud or otherwise audibly presented by the screen reader application to the user. It will be appreciated that any information can be coded into the list element so as to be audibly presented using a screen reader application, and thus, the present disclosure is not limited to the duration information and the event type information.

Multiple events may overlap during a given time duration. For example, two events may be scheduled during the Tuesday, 2:00 PM to 4:00 PM time frame; a first event from 2:30 PM to 4:00 PM, and a second event from 3:00 PM to 4:00 PM. The accessibility component can be configured to convey an indication of the event overlap to users who are blind or visually impaired, while at the same time, displaying this information on calendar 200 to sighted users without the need for multiple codebases. In some implementations, the accessibility component can be configured to provide the time and/or duration information to a screen reader application to be audibly presented to users who are blind or visually impaired. In this case, the user would recognize that the events overlap after the time duration of each event is audibly presented to the user. In some implementations, when the accessibility component renders the on-screen event elements for two events that overlap, the accessibility component can detect that this overlap occurred. For example, detecting the overlap of at least two events may be based on the number of event cells that are rendered for displaying on calendar 200; if two event cells are rendered for the same time range, then the accessibility component may determine that an overlap of events exists. Upon detecting an event overlap, the accessibility component may be configured to automatically generate text information that is available for the screen reader application to interpret and audibly present to the user. For example, upon detecting that an overlap occurred, the accessibility component may generate the following text information: "Event overlap detected" or "There is an overlap of two events between 2:00 PM and 4:00 PM."

It will be appreciated that multiple calendars can be layered on top of each other. To illustrate and only as a non-limiting example, the user can add a family events calendar and a work events calendar to calendar 200. In this example, accessibility component can perform operations, as described above, but for two calendars instead of one calendar.

Figure 3:
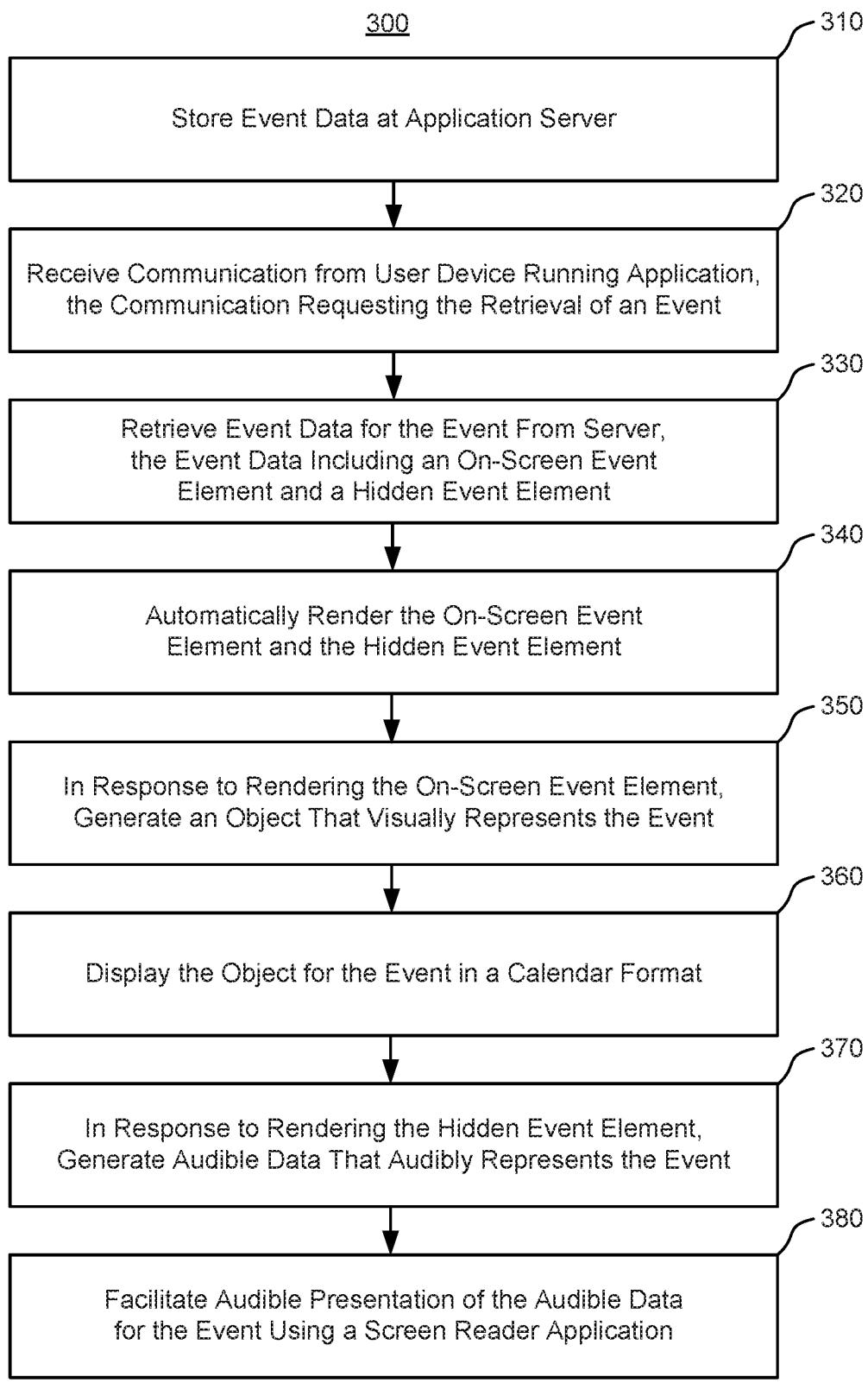
FIG. 3 is a flowchart representing a process for providing a fully accessible web-based calendar using a single codebase, according to certain embodiments of the present disclosure.

FIG. 3 illustrates a flowchart that represents process 300 for providing a fully accessible web-based calendar using a single codebase, according to certain embodiments of the present disclosure. Process 300 may be performed at least in part by an accessibility component (e.g., accessibility component 160), an application server (e.g., application 140), a database (e.g., event database 150), and/or a user device (e.g., user device 110). Further, process 300 describes a computer-implemented method for providing event information to both sighted users and users who are blind or visually impaired, while using a single codebase to render a web-based calendar.

At block 310, event data can be stored at an application server, at which an application is hosted or deployed. In some implementations, the event data can represent a scheduled event. For example, the event data can be represented by a single codebase that includes each of an on-screen event element (e.g., the element rendered on-screen) and/or a hidden event element (e.g., the special markup attached to the on-screen element, such as a class). Further, each of the on-screen event element and the hidden event element can indicate at least one event parameter (e.g., date, time, location, etc.) that characterizes the event. The event data may be specific to the application. In some cases, the application may not be configured with capabilities to display a calendar of the event data stored within the application's databases. Accordingly, the accessibility component can be integrated into the application to retrieve the application's event data and display that event data in a calendar format in a manner that is fully accessible to both sighted users and users who are blind or visually challenged without needing to manage multiple codebases. As non-limiting examples, the event data specific to an application may be the dates and times of hearings in a courthouse, of inspections, of business meetings, and so on.

At block 320, the application server(s) may receive a communication from a user device that is running the application. For example, the communication may correspond to a request to view the event data within a calendar format. Further, the user device may also be running additionally be running a screen reader application (e.g., JAWS). The user operating the user device may select a hyperlink that triggers the application access the accessibility component for the purpose of displaying the event data in a fully-accessible calendar format. At block 330, the event data may be retrieved from the database or the application server.

At block 340, once the event data is retrieved, the accessibility component may render the event data. Rendering the event data may include automatically rendering each of the on-screen event element and the hidden event element included in the event data for a specific event or for all events. At block 350, in response to rendering the on-screen event element, the accessibility component may generate a displayable object, such as an event cell as shown in FIG. 2. For example, the displayable object may include an event cell that presents the time bound information of a specific event, including the start time and end time of the specific event. The displayable object may be displayed within a calendar format, such as calendar 200. At block 360, the rendered object may be displayed on a screen of the user device. The displayed object may visually represent the event within the calendar format. Further, the displayed object may visually indicate the at least one event parameter that characterizes the event. For example, the displayed object may indicate the time range of an event as being between 2:00 PM and 4:00 PM. The time range may be represented using text, or in some cases, the shape of the displayed object may represent the time range (e.g., a block that visibly spans a range from 2:00 PM to 4:00 PM). At block 370, in response to rendering the hidden event element, the accessibility component may generate audible data that audibly presents the at least one event parameter that characterizes the event. For example, the audible data may be used by a screen reader application to audibly present the event information to the user. The generation of the audibly data may be based, at least in part, on the text information that is tagged in the hidden event element (e.g., the class that tags certain text information to be rendered off screen). In some implementations, the accessibility component does not generate audible data based on the text information included in the hidden event element, but rather, the accessibility component tags certain text to be consumed or interpreted by a screen reader application. In this case, the screen reader application would generate the audible data based on the text that is tagged or otherwise flagged in the hidden event element. The tagged or flagged text may correspond to the event parameters that characterize the event, or any other event information the represents the event. At block 380, an audible presentation of the audible data may be read aloud to the user using a screen reader application. For example, rendering the hidden event element, which may render off screen certain text information of the on-screen event element, may provide or otherwise make available certain text to be consumed and audibly presented by a screen reader application.

It will be appreciated that process 300 may include additional steps, including receiving, while the object is displayed within the calendar format, input at the screen reader application. The input may correspond to an instruction to fetch additional event data stored at the server. For example, the additional event data may represent an additional event. Process 300 may also include retrieving the additional event using an application programming interface (e.g., a RESTful web service). Further, process 300 may include the step of rendering the additional event data causing: an additional object to be displayed in the calendar format and additional audible data to be generated. The additional object may visually indicate an additional event parameter corresponding to the additional event. The generated additional audible data may cause the screen reader application to audibly present the additional event parameter.

It will be appreciated that each of the displaying of the object representing the event and the audible presentation of the at least one event parameter by the screen reader application are performed using the single codebase. It will also be appreciated that the on-screen event element may include a markup code that, when rendered, displays the object indicating the at least event parameter. Further, the hidden event element may include an additional markup code associated with the markup code. For example, the additional markup code, when rendered, may cause the at least event parameter to be available to the screen reader application. It will also be appreciated that each of the on-screen event element and the hidden event element are rendered at the time of loading an interface of the application (e.g., calendar 200). The interface of the application may be configured to display a calendar with the calendar format. It will also be appreciated that the screen reader application can audibly present the at least one event parameter of the event without multiple codebases for the application. It will also be appreciated that the hidden event element, when rendered, may cause a Braille representation of the at least one event parameter to be presented within the application or in association with the application on another device.

Figure 4:
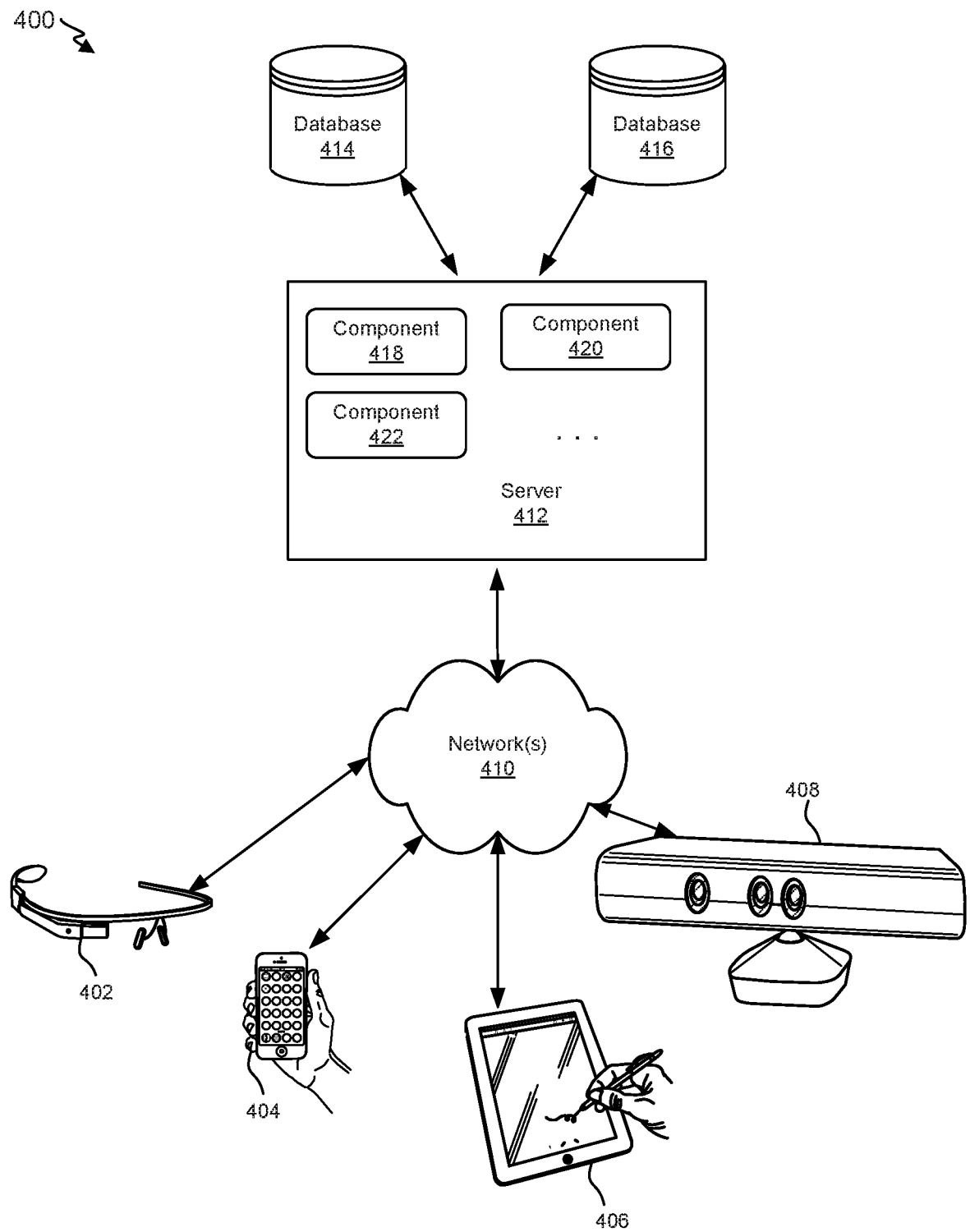
FIG. 4 is a simplified diagram illustrating a distributed system for implementing one of the embodiments.

FIG. 4 depicts a simplified diagram of a distributed system 400 for implementing one of the embodiments. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications provided by one or more of the components of the system. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in the figure, the software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in the figure is thus one example of a distributed system for implementing an embodiment system and is not intended to be limiting.

Client computing devices 402, 404, 406, and/or 408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 402, 404, 406, and 408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 410.

Although exemplary distributed system 400 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), such as one based on Ethernet, Token-Ring and/or the like. Network(s) 410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 412 may be adapted to run one or more services or software applications described in the foregoing disclosure. For example, server 412 may correspond to a server for performing processing described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
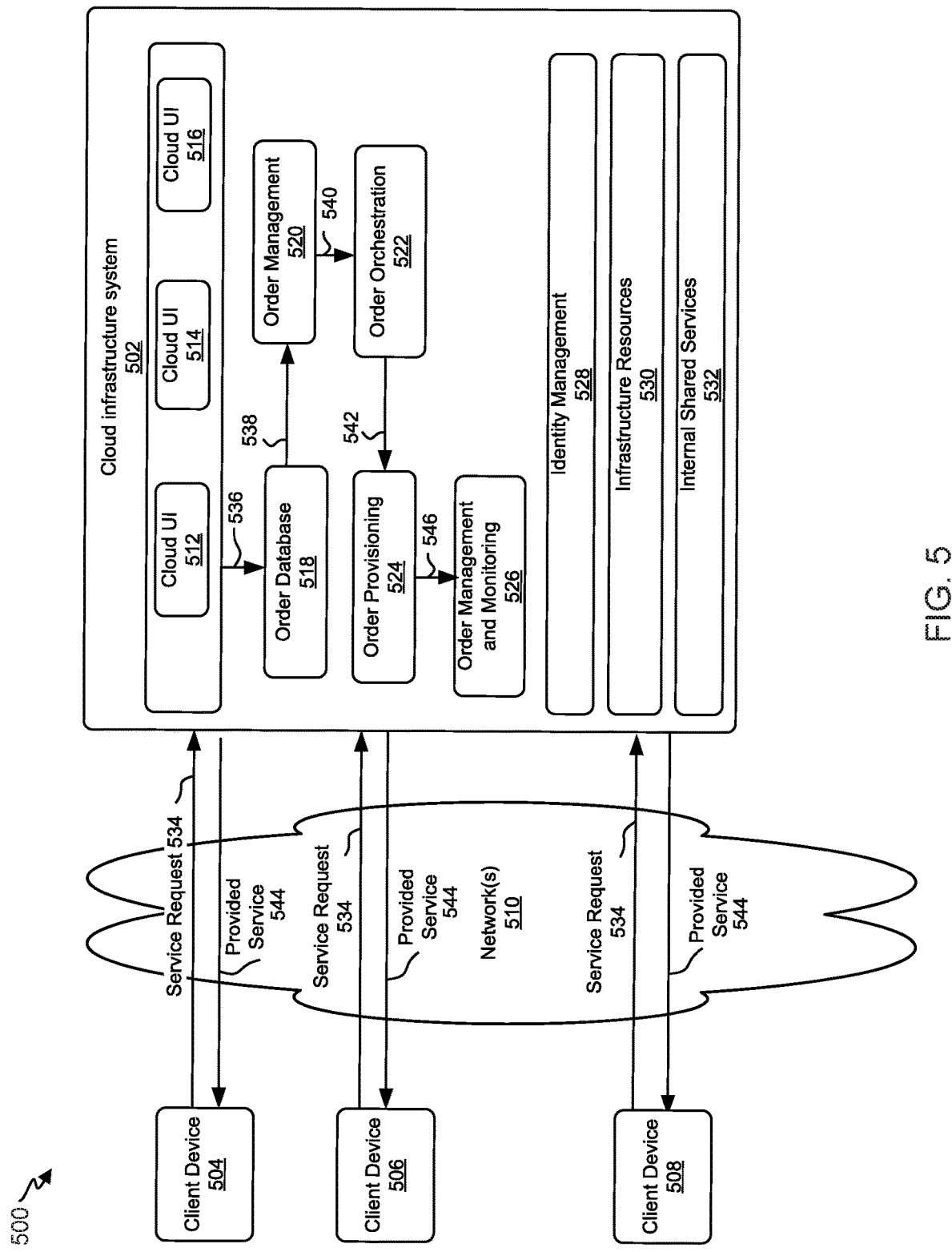
FIG. 5 is a simplified block diagram illustrating one or more components of a system environment.

FIG. 5 is a simplified block diagram of one or more components of a system environment 500 by which services provided by one or more components of an embodiment system may be offered as cloud services, in accordance with an embodiment of the present disclosure. In the illustrated embodiment, system environment 500 includes one or more client computing devices 504, 506, and 508 that may be used by users to interact with a cloud infrastructure system 502 that provides cloud services. The client computing devices may be configured to operate a client application such as a web browser, a proprietary client application (e.g., Oracle Forms), or some other application, which may be used by a user of the client computing device to interact with cloud infrastructure system 502 to use services provided by cloud infrastructure system 502.

It should be appreciated that cloud infrastructure system 502 depicted in the figure may have other components than those depicted. Further, the embodiment shown in the figure is only one example of a cloud infrastructure system that may incorporate an embodiment of the invention. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 402, 404, 406, and 408.

Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between clients 504, 506, and 508 and cloud infrastructure system 502. Each network may be any type of network familiar to those skilled in the art that can support data communications using any of a variety of commercially-available protocols, including those described above for network(s) 610.

Cloud infrastructure system 502 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform.

In some embodiments, resources in cloud infrastructure system 502 may be shared by multiple users and dynamically re-allocated per demand. Additionally, resources may be allocated to users in different time zones. For example, cloud infrastructure system 530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 and by the services provided by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in the figure, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In exemplary operation 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI), cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

After an order has been placed by the customer, the order information is received via the cloud UIs, 512, 514 and/or 516.

At operation 536, the order is stored in order database 518. Order database 518 can be one of several databases operated by cloud infrastructure system 518 and operated in conjunction with other system elements.

At operation 538, the order information is forwarded to an order management module 520. In some instances, order management module 520 may be configured to perform billing and accounting functions related to the order, such as verifying the order, and upon verification, booking the order.

At operation 540, information regarding the order is communicated to an order orchestration module 522. Order orchestration module 522 may utilize the order information to orchestrate the provisioning of services and resources for the order placed by the customer. In some instances, order orchestration module 522 may orchestrate the provisioning of resources to support the subscribed services using the services of order provisioning module 524.

In certain embodiments, order orchestration module 522 enables the management of processes associated with each order and applies logic to determine whether an order should proceed to provisioning. At operation 542, upon receiving an order for a new subscription, order orchestration module 522 sends a request to order provisioning module 524 to allocate resources and configure those resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. Order orchestration module 522 may thus be isolated from implementation details, such as whether or not services and resources are actually provisioned on the fly or pre-provisioned and only allocated/assigned upon request.

At operation 544, once the services and resources are provisioned, a notification of the provided service may be sent to customers on client devices 504, 506 and/or 508 by order provisioning module 524 of cloud infrastructure system 502.

At operation 546, the customer's subscription order may be managed and tracked by an order management and monitoring module 526. In some instances, order management and monitoring module 526 may be configured to collect usage statistics for the services in the subscription order, such as the amount of storage used, the amount data transferred, the number of users, and the amount of system up time and system down time.

In certain embodiments, cloud infrastructure system 500 may include an identity management module 528. Identity management module 528 may be configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
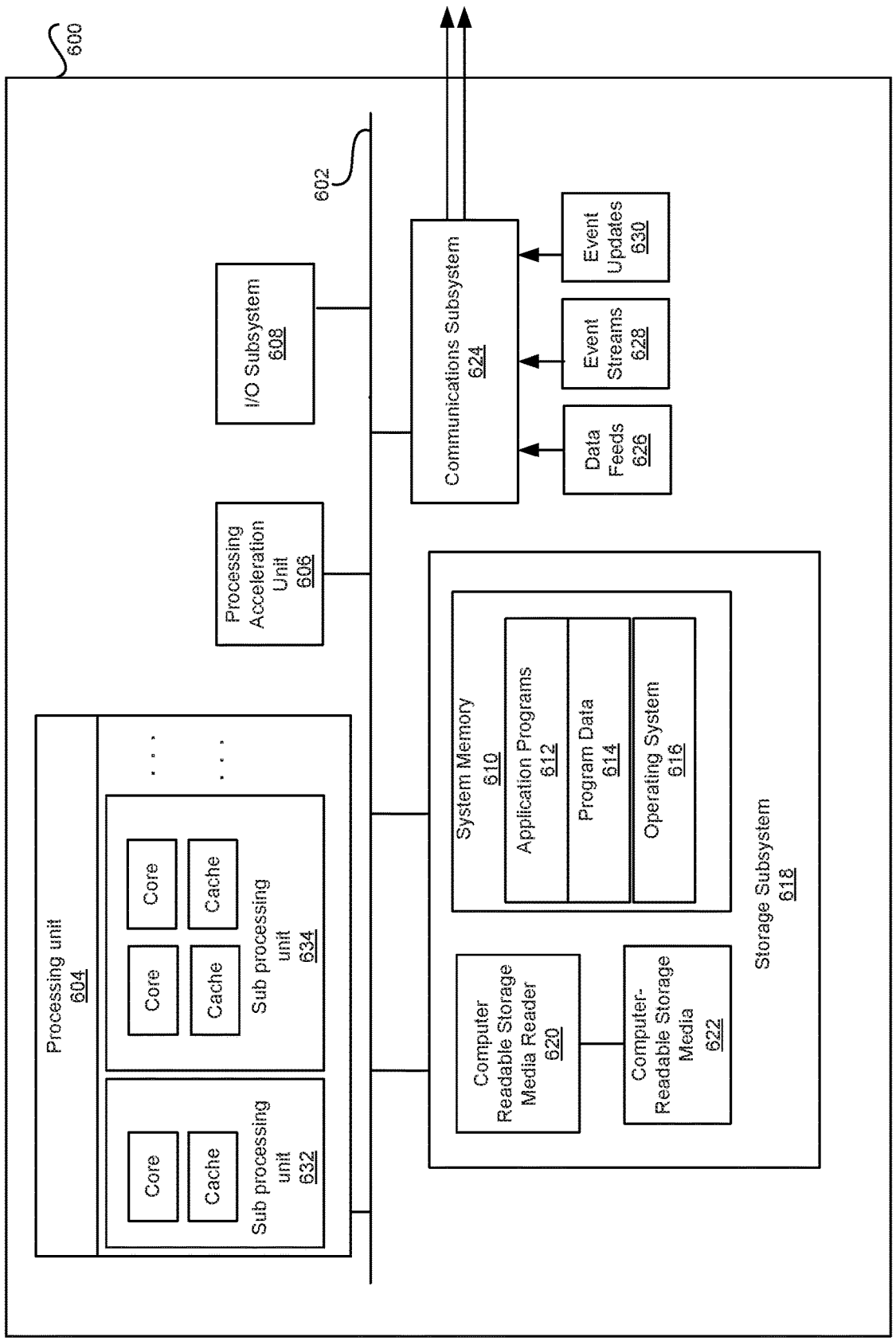
FIG. 6 illustrates an exemplary computer system, in which various embodiments of the present invention may be implemented.

FIG. 6 illustrates an exemplary computer system 600, in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 620 that can further be connected to computer-readable storage media 622.

Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 924 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
storing, by a server, event data generated by an application, the event data representing one or more events, the event data corresponding to a single codebase that includes each of an on-screen event element and a hidden event element, each of the on-screen event element and the hidden event element indicating at least one event parameter characterizing the one or more events, and the on-screen event element being a list element including text data configured for processing by a screen reader application;

receiving a communication from a user device that is executing the application, the communication corresponding to a request to view a list of events within a calendar format, and the user device additionally executing the screen reader application;

retrieving the event data from the server;

automatically rendering each of the on-screen event element and the hidden event element included in the event data;

in response to rendering the on-screen event element, generating an object that visually represents the one or more events within the calendar format and causing the screen reader application to audibly present the text data included in the list element;

displaying the object that visually represents the one or more events within the calendar format, the displayed object visually indicating the at least one event parameter that characterizes the one or more events;

in response to rendering the hidden event element, generating audible data that audibly presents the at least one event parameter that characterizes the one or more events; and facilitating an audible presentation using the audible data, the audible presentation audibly indicating the at least one event parameter by the screen reader application.

2. The computer-implemented method of claim 1, further comprising:

receiving, while the object is displayed within the calendar format, input at the screen reader application, the input corresponding to an instruction to fetch additional event data stored at the server, and the additional event data representing an additional event;

retrieving the additional event using an application programming interface; and rendering the additional event data causing:
an additional object to be displayed in the calendar format, the additional object visually indicating an additional event parameter corresponding to the additional event, and
additional audible data to be generated, wherein the generated additional audible data causes the screen reader application to audibly present the additional event parameter.

3. The computer-implemented method of claim 1, wherein each of the displaying of the object representing the one or more events and the audible presentation of the at least one event parameter by the screen reader application are performed using the single codebase.

4. The computer-implemented method of claim 1, wherein the on-screen event element includes a markup code that, when rendered, displays the object indicating the at least event parameter, wherein the hidden event element includes an additional markup code associated with the markup code, wherein the additional markup code, when rendered, causes the at least event parameter to be available to the screen reader application.

5. The computer-implemented method of claim 1, wherein each of the on-screen event element and the hidden event element are rendered at a time of loading an interface of the application, wherein the interface of the application is configured to display a calendar with the calendar format.

6. The computer-implemented method of claim 1, wherein the screen reader application audibly presents the at least one event parameter of the one or more events without multiple codebases for the application.

7. The computer-implemented method of claim 1, wherein the hidden event element, when rendered, causes a Braille representation of the at least one event parameter to be displayed within the application.

8. A system, comprising:

one or more data processors; and a non-transitory computer-readable storage medium containing instructions which, when executed on the one or more data processors, cause the one or more data processors to perform operations including:

storing, by a server, event data generated by an application, the event data representing one or more events, the event data corresponding to a single codebase that includes each of an on-screen event element and a hidden event element, each of the on-screen event element and the hidden event element indicating at least one event parameter characterizing the one or more events, and the on-screen event element being a list element including text data configured for processing by a screen reader application;

receiving a communication from a user device that is executing the application, the communication corresponding to a request to view a list of events within a calendar format, and the user device additionally executing the screen reader application;

retrieving the event data from the server;

automatically rendering each of the on-screen event element and the hidden event element included in the event data;

in response to rendering the on-screen event element, generating an object that visually represents the one or more events within the calendar format and causing the screen reader application to audibly present the text data included in the list element;

displaying the object that visually represents the one or more events within the calendar format, the displayed object visually indicating the at least one event parameter that characterizes the one or more events;

in response to rendering the hidden event element, generating audible data that audibly presents the at least one event parameter that characterizes the one or more events; and facilitating an audible presentation using the audible data, the audible presentation audibly indicating the at least one event parameter by the screen reader application.

9. The system of claim 8, wherein the operations further comprise:

receiving, while the object is displayed within the calendar format, input at the screen reader application, the input corresponding to an instruction to fetch additional event data stored at the server, and the additional event data representing an additional event;

retrieving the additional event using an application programming interface; and rendering the additional event data causing:
an additional object to be displayed in the calendar format, the additional object visually indicating an additional event parameter corresponding to the additional event, and
additional audible data to be generated, wherein the generated additional audible data causes the screen reader application to audibly present the additional event parameter.

10. The system of claim 8, wherein each of the displaying of the object representing the one or more events and the audible presentation of the at least one event parameter by the screen reader application are performed using the single codebase.

11. The system of claim 8, wherein the on-screen event element includes a markup code that, when rendered, displays the object indicating the at least event parameter, wherein the hidden event element includes an additional markup code associated with the markup code, wherein the additional markup code, when rendered, causes the at least event parameter to be available to the screen reader application.

12. The system of claim 8, wherein each of the on-screen event element and the hidden event element are rendered at a time of loading an interface of the application, wherein the interface of the application is configured to display a calendar with the calendar format.

13. The system of claim 8, wherein the screen reader application audibly presents event parameters of the one or more events without multiple codebases for the application.

14. The system of claim 8, wherein the hidden event element, when rendered, causes a Braille representation of the at least one event parameter to be displayed within the application.

15. A computer-program product tangibly embodied in a non-transitory machine-readable storage medium, including instructions configured to cause a data processing apparatus to perform operations including:
   storing, by a server, event data generated by an application, the event data representing one or more events, the event data corresponding to a single codebase that includes each of an on-screen event element and a hidden event element, each of the on-screen event element and the hidden event element indicating at least one event parameter characterizing the one or more events, and the on-screen event element being a list element including text data configured for processing by a screen reader application;
   receiving a communication from a user device that is executing the application, the communication corresponding to a request to view a list of events within a calendar format, and the user device additionally executing the screen reader application;
   retrieving the event data from the server;
   automatically rendering each of the on-screen event element and the hidden event element included in the event data;
   in response to rendering the on-screen event element, generating an object that visually represents the one or more events within the calendar format and causing the screen reader application to audibly present the text data included in the list element;
   displaying the object that visually represents the one or more events within the calendar format, the displayed object visually indicating the at least one event parameter that characterizes the one or more events;
   in response to rendering the hidden event element, generating audible data that audibly presents the at least one event parameter that characterizes the one or more events; and
   facilitating an audible presentation using the audible data, the audible presentation audibly indicating the at least one event parameter by the screen reader application.

16. The computer-program product of claim 15, wherein the operations further comprise:
   receiving, while the object is displayed within the calendar format, input at the screen reader application, the input corresponding to an instruction to fetch additional event data stored at the server, and the additional event data representing an additional event;
   retrieving the additional event using an application programming interface; and
   rendering the additional event data causing:
      an additional object to be displayed in the calendar format, the additional object visually indicating an additional event parameter corresponding to the additional event, and
      additional audible data to be generated, wherein the generated additional audible data causes the screen reader application to audibly present the additional event parameter.

17. The computer-program product of claim 15, wherein each of the displaying of the object representing the one or more events and the audible presentation of the at least one event parameter by the screen reader application are performed using the single codebase.

18. The computer-program product of claim 15, wherein the on-screen event element includes a markup code that, when rendered, displays the object indicating the at least event parameter, wherein the hidden event element includes an additional markup code associated with the markup code, wherein the additional markup code, when rendered, causes the at least event parameter to be available to the screen reader application.

19. The computer-program product of claim 15, wherein each of the on-screen event element and the hidden event element are rendered at a time of loading an interface of the application, wherein the interface of the application is configured to display a calendar with the calendar format.

20. The computer-program product of claim 15, wherein the screen reader application audibly presents event parameters of the one or more events without multiple codebases for the application.

* * * * *